United States Patent
Pai et al.

(10) Patent No.: US 10,257,162 B2
(45) Date of Patent: Apr. 9, 2019

(54) METHOD AND SYSTEM FOR PROVIDING "ANYWHERE ACCESS" FOR FIXED BROADBAND SUBSCRIBERS

(71) Applicant: Telefonaktiebolaget L M Ericsson (publ), Stockholm (SE)

(72) Inventors: Narayana Hosdurg Pai, Bangalore (IN); Shankar Kambat Ananthanarayanan, Bangalore (IN); Syed Nadeemulla R, Bangalore (IN); Madhavan Jayabalan, Bangalore (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 317 days.

(21) Appl. No.: 14/623,282

(22) Filed: Feb. 16, 2015

(65) Prior Publication Data
US 2016/0241515 A1     Aug. 18, 2016

(51) Int. Cl.
G06F 15/173     (2006.01)
H04L 29/06     (2006.01)
(Continued)

(52) U.S. Cl.
CPC ...... H04L 63/0209 (2013.01); H04L 12/2803 (2013.01); H04L 45/02 (2013.01);
(Continued)

(58) Field of Classification Search
CPC . H04L 63/0209; H04L 12/2803; H04L 45/02; H04L 45/66; H04L 45/74;
(Continued)

(56) References Cited

U.S. PATENT DOCUMENTS 7,469,294 B1 * 12/2008 Luo ............... H04L 63/0272
    370/406
8,675,488 B1 * 3/2014 Sidebottom ........... H04L 67/141
    370/235
(Continued)

FOREIGN PATENT DOCUMENTS

WO     2012083865 A1     6/2012

OTHER PUBLICATIONS

Ali, Z., et al., "Node-IDS Based Resource Reservation Protocol (RSVP) Hello: A Clarification Statement", Network Working Group; RFC 4558; Jun. 2006; 7 pages.
(Continued)

Primary Examiner — Sm A Rahman
(74) Attorney, Agent, or Firm — NDWE, LLP

(57) ABSTRACT

A method is implemented by a border network gateway for enabling an end user device to access home network resources and receive subscriber services in a visited network. The method includes receiving a connection from the end user device, querying an authentication server to obtain a virtual extended local area network (VXLAN) network identifier (VNI) of the end user device, and checking for the VNI for the end user device in a demultiplexor table of the border network gateway. The process further involves determining whether the end user device is in a home network of the end user device and updating an entry in the demultiplexor table to include a media access control address for the end user device in response to determining the end user device is not in the home network of the end user device.

16 Claims, 10 Drawing Sheets

(51) Int. Cl.
| | |
|---|---|
| *H04W 48/08* | (2009.01) |
| *H04L 12/931* | (2013.01) |
| *H04L 12/28* | (2006.01) |
| *H04L 12/721* | (2013.01) |
| *H04L 12/741* | (2013.01) |
| *H04L 12/751* | (2013.01) |
| *H04W 88/16* | (2009.01) |

(52) U.S. Cl.
CPC .............. *H04L 45/66* (2013.01); *H04L 45/74* (2013.01); *H04L 49/354* (2013.01); *H04L 63/0876* (2013.01); *H04L 63/101* (2013.01); *H04W 48/08* (2013.01); *H04W 88/16* (2013.01)

(58) Field of Classification Search
CPC . H04L 49/354; H04L 63/0876; H04L 63/101; H04W 48/08
USPC .......................................................... 709/225
See application file for complete search history.

(56) References Cited

U.S. PATENT DOCUMENTS

| | | | | |
|---|---|---|---|---|
| 2006/0282662 | A1* | 12/2006 | Whitcomb .............. | G06F 21/33 713/156 |
| 2008/0092043 | A1* | 4/2008 | Trethewey ............ | G06F 1/1626 715/705 |
| 2010/0177752 | A1* | 7/2010 | Aggarwal ............... | H04L 45/50 370/338 |
| 2013/0265941 | A1* | 10/2013 | Chang ................. | H04L 12/2856 370/328 |
| 2015/0223068 | A1* | 8/2015 | Thelen ................. | H04L 63/083 726/7 |

OTHER PUBLICATIONS

Andersson, L., et al., "LDP Specification", Network Working Group; RFC 5036; Oct. 2007; 135 pages.
Awduche, D., et al., "RSVP-TE: Extensions to RSVP for LSP Tunnels", Network Working Group; RFC 3209; Dec. 2001; 61 pages.
Babiarz, J., et al., "Configuration Guidelines for DiffServ Service Classes", Network Working Group; RFC 4594; Aug. 2006; 57 pages.
Baker, F., et al., "A Differentiated Services Code Point (DSCP) for Capacity-Admitted Traffic", Internet Engineering Task Force (IETF); RFC 5865; May 2010; 14 pages.
Baker, F., et al., "Management Information Base for the Differentiated Services Architecture", Network Working Group; RFC 3289; May 2002; 107 pages.
Berger, L., "Generalized Multi-Protocol Label Switching (GMPLS) Signaling Resource ReserVation Protocol-Traffic Engineering (RSVP-TE) Extensions", Network Working Group; RFC 3473; Jan. 2003; 42 pages.
Bernet, Y., et al., "An Informal Management Model for Diffserv Routers", Network Working Group; RFC 3290; May 2002; 56 pages.
Black, D., "Differentiated Services and Tunnels", Network Working Group; RFC 2983; Oct. 2000; 14 pages.
Black, D., et al., "Per Hop Behavior Identification Codes", Network Working Group; RFC 3140; Jun. 2001; 8 pages.
Blake, S., et al., "An Architecture for Differentiated Services", Network Working Group; RFC 2475; Dec. 1998; 36 pages.
Borman, D., et al., "IPv6 Jumbograms", Network Working Group; RFC 2675; Aug. 1999; 9 pages, Copyright The Internet Society 1999.
Braden, R., et al., "Resource ReSerVation Protocol (RSVP)", Network Working Group; RFC 2205; Sep. 1997; 112 pages.

Chan, K., et al., "Differentiated Services Quality of Service Policy Information Base", Network Working Group; RFC 3317; Mar. 2003; 96 pages.
Charny, A., et al., "Supplemental Information for the New Definition of the EF PHB (Expedited Forwarding Per-Hop Behavior)", Network Working Group; RFC 3247; Mar. 2002; 24 pages.
Coltun, R., et al., "OSPF for IPv6", Network Working Group; RFC 5340; Jul. 2008; 60 pages.
Davie, B., et al., "An Expedited Forwarding PHB (Per-Hop Behavior)", Network Working Group; RFC 3246; Mar. 2002; 24 pages.
Deering, S., et al., "Internet Protocol Version 6 (IPv6)", Network Working Group, Standards Track, RFC 2460, (Dec. 1998), 1-35.
Eggert, L., et al., "Unicast UDP Usage guidelines for Application Designers", Network Working Group; RFC 5405; Nov. 2008; 27 pages.
Fenner, B., et al., "Management Information Base for the User Datagram Protocol (UDP)", Network Working Group; RFC 4113; Jun. 2005; 19 pages.
Grossman, D., "New Terminology and Clarifications for Diffserv", Network Working Group; RFC 3260; Apr. 2002; 10 pages.
Hedrick, C., "Routing Information Protocol", Network Working Group; RFC 1058; Jun. 1988; 33 pages.
Heinanen, J., et al., "Assured Forwarding PHB Group", Network Working Group; RFC 2597; Jun. 1999; 11 pages.
Housley, R., et al., "Using Advanced Encryption Standard (AES) CCM Mode with IPsec Encapsulating Security Payload (ESP)", Network Working Group; RFC 4309; Dec. 2005; 13 pages.
Kent, S., et al., "Security Architecture for the Internet Protocol", Network Working Group; RFC 4301; Dec. 2005; 101 pages.
Kompella, K., et al., "Procedures for Modifying the Resource reSerVation Protocol (RSVP)", Network Working Group; RFC 3936; Oct. 2004; 7 pages.
Malkin, G., et al., "RIP Version 2", Network Working Group; RFC 2453; Nov. 1998; 39 pages.
Malkin, G., et al., "RIPng for IPv6", Network Working Group; RFC 2080; Jan. 1997; 19 pages.
Moy, John T., "OSPF Version 2", RFC 2328 (rfc2328). The Internet Engineering Task Force, 48377 Fremont Blvd. Suite 117, Fremont, CA 94538, USA, Apr. 1998; downloaded on Mar. 17, 2009 from http://rfc.dotsrc.org/rfc/rfc2328.html, (Apr. 1998), 246 pages.
Nichols, K., et al., "Definition of Differentiated Services Per Domain Behaviors and Rules for their Specification", Network Working Group; RFC 3086; Apr. 2001; 24 pages.
Nichols, K., et al., "Definition of the Differentiated Services Field (DS Field) in the IPv4 and IPv6 Headers", Network Working Group; RFC 2474; Dec. 1998; 20 pages.
Oran, D., "RFC 1142 OSI IS-IS Intra-Domain Routing Protocol", Digital Equipment Corp. Feb. 1990, http://www.faqs.org/rfcs/rfc1142.html., Oct. 19, 2011.
Polk, J., et al., "A Resource Reservation Protocol (RSVP) Extension for the Reduction of Bandwidth of a Reservation Flow", Network Working Group; RFC 4495; May 2006; 21 pages.
Postel, J., "Transmission Control Protocol", STD 7, RFC 793, Internet Standard, Information Sciences Institute, USC, 4676 Admiralty Wy, Marina del Rey, CA 90291., (Sep. 1981), 91 pages.
Postel, J., "User Datagram Protocol", RFC 768, (Aug. 28, 1980), 3 pages.
Rekhter, Y., et al., "A Border Gateway Protocol 4 (BGP-4)", Network Working Group; RFC 4271; Jan. 2006; 104 pages.
Rosen, et al., Network Working Group; RFC 4364; ;BGP/MPLS IP Virtual Private Networks (VPNs), copyright the Internet Society (2006); Feb. 2006; 47pgs.
Shenker, S., et al., "Specification of Guaranteed Quality of Services", Network Working Group; RFC 2212; Sep. 1997; 20 pages.
Socolofsky, T., et al., "A TCP/IP Tutorial", Network Working Group; RFC 1180; Jan. 1991; 28 pages.
Wroclawski, J., "Specification of the Controlled-Load Network Element Service", Network Working Group; RFC 2211; Sep. 1997; 19 pages.
Wroclawski, J., "The Use of RSVP with IETF Integrated Services", Network Working Group; RFC 2210; Sep. 1997; 33 pages.
"Evolution of the Broadband Network Gateway", http://resources.alcatel-lucent.com/?cid=157553; 22 pages.

(56) References Cited

OTHER PUBLICATIONS

"Virtual Home Gateway", http://archive.eurescome.eu/-pub/deliverables/documents/P2000-series/P2055/D1/P055-D1.pdf; Sep. 2011;86 pages.

\* cited by examiner

METHOD AND SYSTEM FOR PROVIDING "ANYWHERE ACCESS" FOR FIXED BROADBAND SUBSCRIBERS

FIELD

Embodiments of the invention relate to providing access to home network resources and subscriber level agreement services and accounting in remote networks. Specifically, the embodiments relate to a method and system implemented by border network gateways to provide 'anywhere access' to fixed broadband subscribers where the fixed broadband subscriber services are accessible from any access network.

BACKGROUND

A fixed broadband service encompasses a subscriber of an Internet Service Provider (ISP) (herein after referred to simply as the 'service provider') accessing the Internet by means of a Customer Premises Equipment (CPE), which connects to the service provider's network through an aggregation device or a switch. Multiple subscribers are aggregated and terminated on a Broadband Network Gateway (BNG). The BNG is a network device in the service provider's network that provides Authentication, Authorization and Accounting (AAA) service to the subscriber and acts as the gateway between the subscriber and the Internet. The CPE acts as the link between the subscriber's home network and the service provider's network and hides the details of individual local devices attached to the CPE. The subscriber can be an individual having a residential home network, a small business having a small network or similar type of entity that administers a local area network or similar network.

A Virtual Home Gateway (vHGW) or Virtual CPE (vCPE) is system where the functions of a CPE are moved into the Service Provider's network. With this solution, the CPE is functioning primarily as an L2 connectivity device to the home network. Individual sessions for devices behind the CPE are directly managed by the BNG. This exposes the subscriber end devices' identity to the BNG and generally the service provider network.

However, the subscriber demands from fixed broadband service go beyond a basic provision of data bandwidth between the subscriber and the Internet. The subscriber is also interested in the service provider maintaining a broader quality of experience. One such requirement for that quality of experience is the ability to provide access to the fixed broadband services of the subscriber when the subscriber is connected to networks other than the home network of the subscriber. Accessing these subscriber services is not possible with current access network architectures.

SUMMARY

A method is implemented by a border network gateway for enabling an end user device to access home network resources and receive subscriber services in a visited network. The method includes receiving a connection from the end user device, querying an authentication server to obtain a virtual extended local area network (VXLAN) network identifier (VNI) of the end user device, and checking for the VNI for the end user device in a demultiplexor table of the border network gateway. The process further involves determining whether the end user device is in a home network of the end user device and updating an entry in the demultiplexor table to include a media access control address for the end user device in response to determining the end user device is not in the home network of the end user device.

A network device functions as a border network gateway and is configured to implement a method for enabling an end user device to access home network resources and receive subscriber services in a visited network. The network device includes a non-transitory computer-readable medium having stored therein a remote access module, and a processor coupled to the non-transitory computer-readable medium. The processor is configured to execute the remote access module. The remote access module is configured to receive a connection from the end user device, to query an authentication server to obtain a virtual extended local area network (VXLAN) network identifier (VNI) of the end user device, to check for the VNI for the end user device in a demultiplexor table of the border network gateway, to determine whether the end user device is in a home network of the end user device, and to update an entry in the demultiplexor table to include a media access control address for the end user device in response to determining the end user device is not in the home network of the end user device.

A computing device functions as a border network gateway. The computing device executes a plurality of virtual machines for implementing network function virtualization (NFV), wherein a virtual machine from the plurality of virtual machines is configured to implement a method for enabling an end user device to access home network resources and receive subscriber services in a visited network. The computing device includes a non-transitory computer-readable medium having stored therein a remote access module, and a processor coupled to the non-transitory computer-readable medium. The processor is configured to execute the virtual machine. The virtual machine executes the remote access module, which is configured to receive a connection from the end user device, to query an authentication server to obtain a virtual extended local area network (VXLAN) network identifier (VNI) of the end user device, to check for the VNI for the end user device in a demultiplexor table of the border network gateway, to determine whether the end user device is in a home network of the end user device, and to update an entry in the demultiplexor table to include a media access control address for the end user device in response to determining the end user device is not in the home network of the end user device.

A control plane device implements a control plane of a software defined networking (SDN) network including a plurality of network devices implementing the data plane of the SDN network, wherein control plane device is configured to execute a method for enabling an end user device to access home network resources and receive subscriber services in a visited network. The control plane device includes a non-transitory computer-readable medium having stored therein a remote access module, and a processor coupled to the non-transitory computer-readable medium. The processor is configured to execute the remote access module. The remote access module is configured to receive a connection from the end user device, query an authentication server to obtain a virtual extended local area network (VXLAN) network identifier (VNI) of the end user device, check for the VNI for the end user device in a demultiplexor table of the border network gateway, to determine whether the end user device is in a home network of the end user device, and to update an entry in the demultiplexor table to include a media access control address for the end user device in response to determining the end user device is not in the home network of the end user device.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1A:
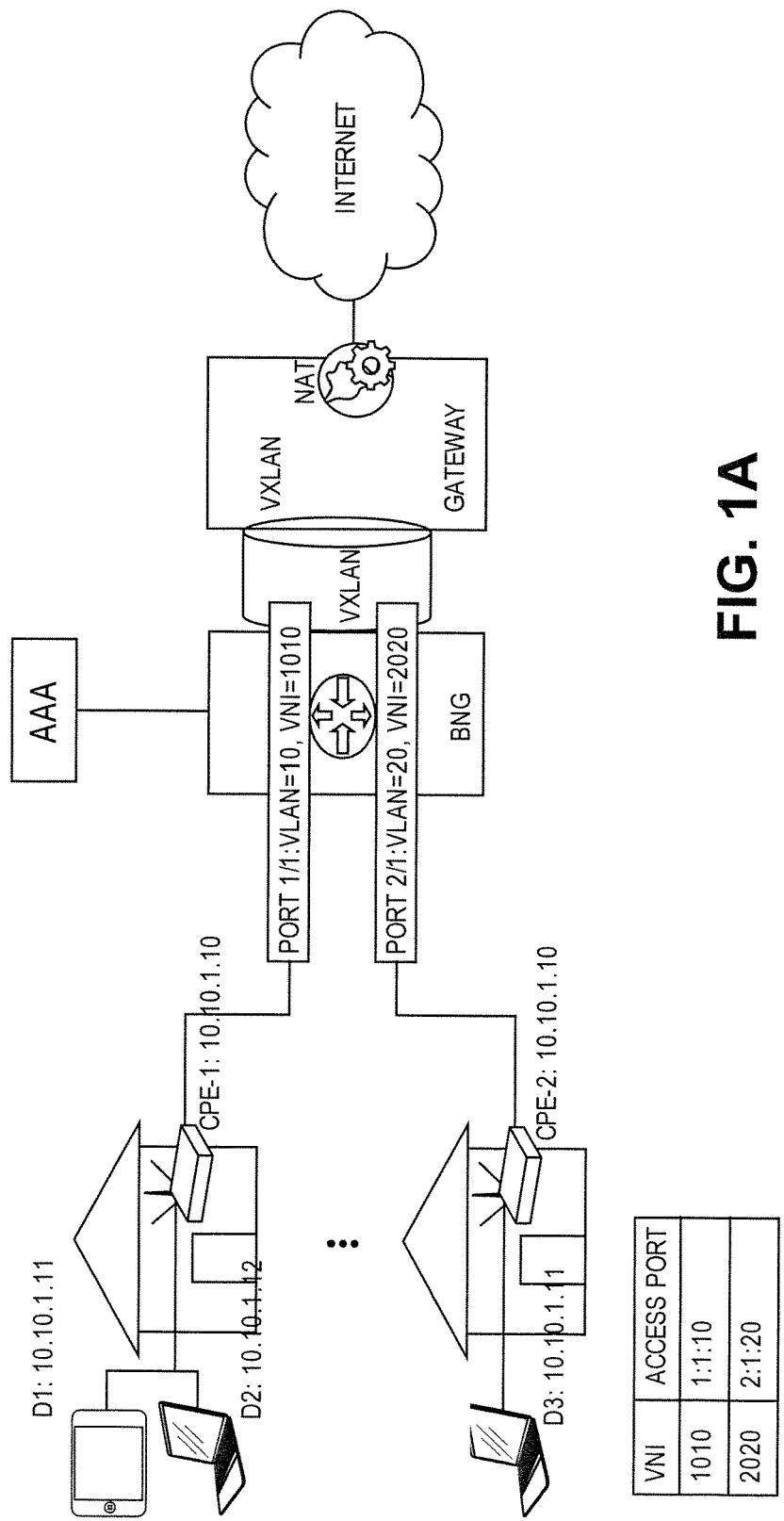
FIG. 1A is a diagram of one embodiment of a network with a virtual home gateway configuration.

The following description describes methods and apparatus for implementing remote access to subscriber services outside of the home network. The services being accessed are those tied to what had previously been considered fixed broadband subscription services such as data throughput levels, home network access and similar features. These services are made accessible by use of an extended virtual local area network and by the tracking of media access control addresses for the user devices of a subscriber at virtual home gateways implemented at border network gateways. The processes to enable this functionality include the tracking of media access control addresses and associated home or current network information as well as the processing of data traffic at border network gateways (BNGs) destined for user devices to ensure proper delivery when the user devices are outside the home network.

References in the specification to "one embodiment," "an embodiment," "an example embodiment," etc., indicate that the embodiment described may include a particular feature, structure, or characteristic, but not every embodiment may necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Overview

As mentioned, the subscriber demand from fixed broadband service goes beyond merely providing data bandwidth to a subscriber in a home network. The subscribers are also seeking a quality of experience from their subscription service that includes use of their subscriber services when connected to networks other than their home network. One such service that is sought by subscribers is the ability of the service provider to provide access to the fixed broadband service from other networks. This is not possible with prior art fixed broadband services. The problems of the prior art provider services include that the fixed broadband services offered are tied to the access of a specific network interface in terms of a connecting slot, port and virtual local area network (e.g., referred to as 'slot:port:vlan') on the BNG where a virtual home gateway architecture is utilized and the subscriber's customer premise equipment (CPE) is terminated at the virtual home gateway implemented at the BNG. This configuration makes the CPE itself immobile. The subscriber's user devices access the broadband service through the CPE and the service is limited to the wireless range or wired connections of the CPE. Further, the subscriber's user devices do not have an identity within the service provider network except where a virtual home gateway is implemented, however, this visibility alone is not sufficient to enable access of the subscriber services, as the local addresses of these devices may conflict with addresses of devices in other networks and traffic destined for the user devices cannot be reliably forwarded to the user devices if they were connected to other networks.

The embodiments of the invention provide a system and method to overcome these limitations of the prior art. The embodiments provide a method and system where the user device identity is tracked in the service provider's network, to provide "anywhere access" service to the subscriber's user devices. For example, a subscriber's user device can freely move out of its home CPE's wireless range into wireless range of another CPE (remote CPE), which in effect connects to different slot:port:vlan of the BNG than the one it would have, had it got connected from the home CPE or in some embodiments where the connection is to a slot:port: vlan on another BNG than the home network CPE connects to.

The invention proposes to preserve the virtual extensible local area network (VXLAN) network identifier (VNI) and using the VNI as a bridging instance and a VXLAN switch to bridge multiple slot:port:vlans on the access side of the BNG, where the BNG has a set of connections to CPEs on its "access" side and a set of connections to other networking devices of a wide area network such as the Internet on its "trunk" side. The accounting for the roaming (i.e. where the user device is in a network other than its home network with its home CPE) subscriber device shall be against the home subscription of the subscriber (using the VNI) and not against the CPE or the access slot:port:vlan connection of the BNG through which the services are granted. The access CPE merely provides L2 connectivity between the subscriber's user device and the service provider network. The embodiments also provide a method to de-multiplex the downstream traffic received at the trunk side of the BNG and that is destined for a user device of a subscriber that may be connected outside of its home network.

The embodiments of the invention provides a value added service to a fixed broadband subscriber by disassociating the accounting for the subscriber from the access connection identified by the slot:port:vlan on the BNG where the CPE of the subscriber is terminated. The CPEs connecting to the BNG of the service provider merely function as a L2 connectivity device whereas the accounting is done against the subscriber's VNI. The subscriber can access the broadband service of the subscriber even outside of the range of the home CPE. The remote CPE can be public networks or in the private networks of other subscribers, public networks can include networks in places like Airports, Hotels and private networks can be those in another subscriber's home network.

The embodiments provide a two stage lookup (i.e., of a VNI and a MAC) for the downstream traffic at the trunk connection. This process is efficient and allows for large scale deployment without introducing forward table lookup bottlenecks at the trunk connection serviced by a trunk card of the BNG. Not only is the MAC look up on a small number of subscriber MACs that are roaming, the MAC look up is done only when one of the devices using the VNI is accessing the network from outside the network of the home CPE.

In other embodiments, it is possible to achieve the solution with a single stage lookup of subscriber MAC at the BNG (i.e. at a network interface card on the trunk side). However, such a MAC lookup would have been on a table containing totality of subscriber's MAC on a plurality of access cards of the BNG facing the subscribers. This introduces a bottleneck and scale problem on the trunk card, thus, the aforementioned embodiments with a VNI and MAC lookup provide advantages in scalability.

In the embodiments, the user device that is roaming (i.e., outside its home network) is still within the extended LAN for the home network, and can access the other user devices on the extended LAN seamlessly. This allows for seamless sharing of media and other applications in the home network like security surveillance, media servers, network printers and similar devices and appliances. The embodiments also provide access using the subscribers home VNI even when the access is from a remote CPE. This has a further of advantage of providing a seamless access to the home network without compromising the security of the visited network.

Virtual Home Gateway Connections

As mentioned, user devices of a subscriber connect to the fixed broadband services through a CPE that serves as an access point. The CPE functions as a L2 connection with a virtual home gateway at the BNG. This connection between the CPE and the BNG is identified using a combination of information, namely slot:port:vlan. With FIGS. 1A-C as references, an example identifier for a user device can be identified and mechanisms for using it can be set forth.

An example user device may be identified by {slot:port: vlan} 1:1:10, which is a home port for the CPE of the home network (e.g., CPE-1). That is, the port to which CPE-1 is connected on the BNG. The VNI for the subscriber in the example is 1010, which can be set by the service provider at the BNG or through the AAA server. A subscriber however may have multiple user devices in its network. User devices are identifed as D1, D2 . . . . Dn. All devices have unique MAC addresses, which as discussed herein by way of example are labeled M1, M2 . . . Mn.

Figure 1B:
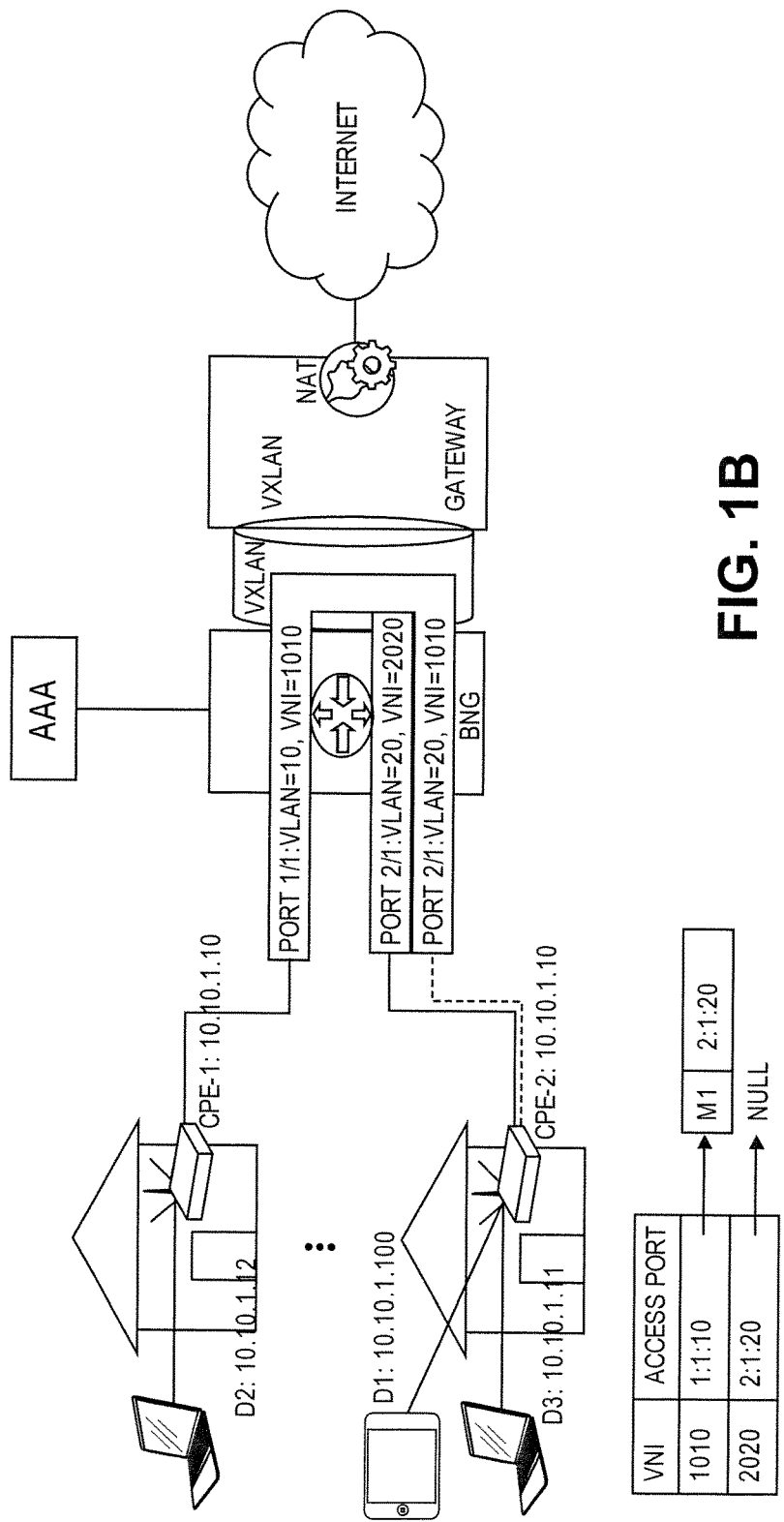
FIG. 1B is a diagram of one embodiment of a network with a virtual home gateway configuration with a user device of a subscriber connecting outside of the home network.

With relation to FIGS. 1A and 1B, a second network having a second CPE (i.e., CPE-2) has a slot:port:vlan of 2:1:20 as its home port with the BNG. That is, the port to which CPE-2 is connected on the BNG. The VNI for the subscriber owning the second network in this example is 2020. The second subscriber may have a user device D3 that in turn has a MAC address M3. The first CPE-1 is home CPE for devices D1 and D2 and remote CPE for D3 if and when D3 connects with CPE-1. Similarly, CPE-2 is home CPE for D3 and remote CPE for D1 and D2 if and when they connect with CPE-2. When the devices are in their home locations, then all devices access the subscriber services from their respective home CPEs and the Virtual Home Gateway of the BNG.

Figure 1C:
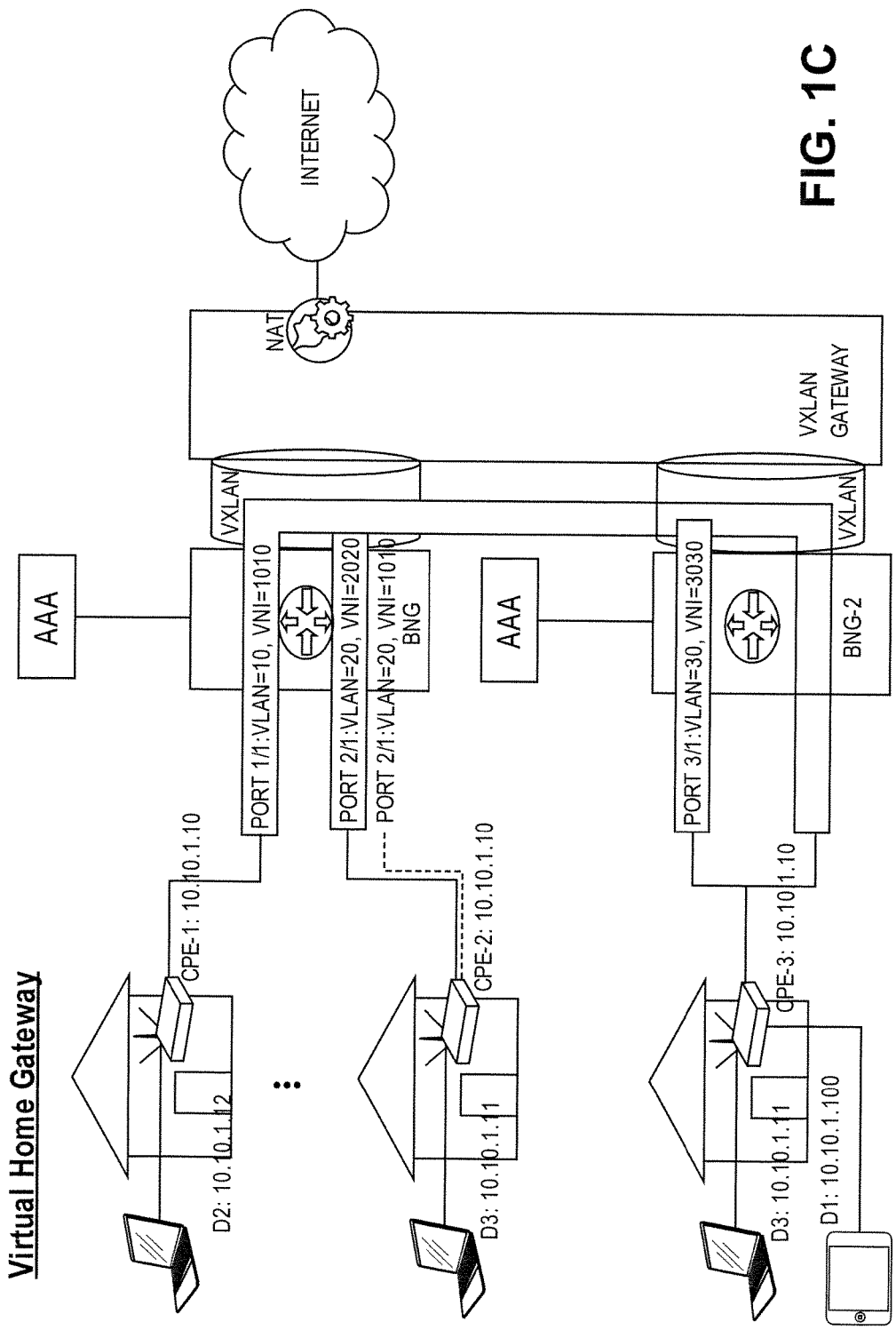
FIG. 1C is a diagram of one embodiment of a network with a virtual home gateway configuration with a user device of a subscriber connecting to a network outside of the home network that is connected to a different BNG than the home network.

Different Virtual Home Gateway deployments are depicted in FIGS. 1A-C. Within each network a home IP addresses is unique, but across the home networks the devices may use the same IP addresses. The IP addresses for individual devices as well as for the CPE are assigned by BNG. The BNG manages the uniqueness of the IP address on a per VNI basis by having a copy of the IP address pool per VNI instance. Traffic is handled as follows, for upstream traffic (from subscriber user device towards the Internet), Ethernet packets hit the access port, which initiates a lookup with source MAC address to get the VXLAN encapsulation (VNI) to be added to the data traffic as it is forwarded towards the trunk side of the BNG and forwarded to the appropriate trunk port. Downstream data traffic (from the Internet towards the subscriber) is handled by use of the VNI demultiplexor table. The trunk side network interface card performs a lookup to identify an access port. An example demultiplexor table is shown in FIG. 1A. When VXLAN packets hit the trunk port they are de-capsulated to extract the VNI. The VNI is looked up in the VNI demultiplexor table to get the access slot:port:vlan to which the traffic needs to be forwarded. At the access port the VLAN tag is added to the L2 frame and is forwarded on the wire. In an alternate implementation, it is possible that the VNI demultiplexor table at the trunk only provides the slot:port, and the VLAN tag is to be obtained at the access card by looking up a destination MAC or VNI.

FIG. 1B illustrates a scenario where the device D1 has moved from its home network to access the subscription services from remote CPE-2, while D2 and D3 are on their home CPEs, CPE-1 and CPE-2 respectively. To support this scenario the embodiments change the way subscriber devices are provisioned in the BNG to allow for this "access anywhere." In this scenario the home CPE-1 and remote CPE-2 are terminating on different access ports on the same BNG. D1, even though it is terminating on a new access slot:port:vlan 2:1:20, shall continue to use its original VNI (1010). The VXLAN gateway implemented by the BNG would provide a bridge instance using the VNI to connect the device to its home network to make it appear as if the device were on its home LAN. There are some of the challenges to overcome for realizing this embodiment. First, device D1 is using a unique IP address from its pool for VNI 1010, which could result in a duplicate IP address with CPE-2, resulting in a conflict. In the embodiments, this is overcome by reserving a sub-pool within the VNI to be used for access from a remote CPE. The IP pool for accessing from remote CPE, while part of the same subnet as that of access from home CPE, shall be maintained as unique across VNI instances. Otherwise, there could be conflict with multiple devices with different VNI's using the same IP address on the same remote CPE. In FIG. 1B, D1 is shown as using IP address 10.10.1.100, which is part of the roaming pool of IP addresses.

Another issue the embodiments handle is that the upstream packets are handled in the same way for D1 as in the case where D1 is accessing services from its home port. That is, a look up the source MAC at the access port to get the VXLAN encapsulation (VNI) and forwarding to the trunk port at the BNG. Downstream traffic lookup normally would result in a conflict. Because devices D1 and D2 have the same VNI, but the traffic for the devices must be routed to different access slot:port:vlans because they connected to different CPEs at differing locations. This creates a network for each device to operate in that is location independent. This is achieved during circuit provisioning when each device connects to the BNG via the respective CPE.

Figure 2:
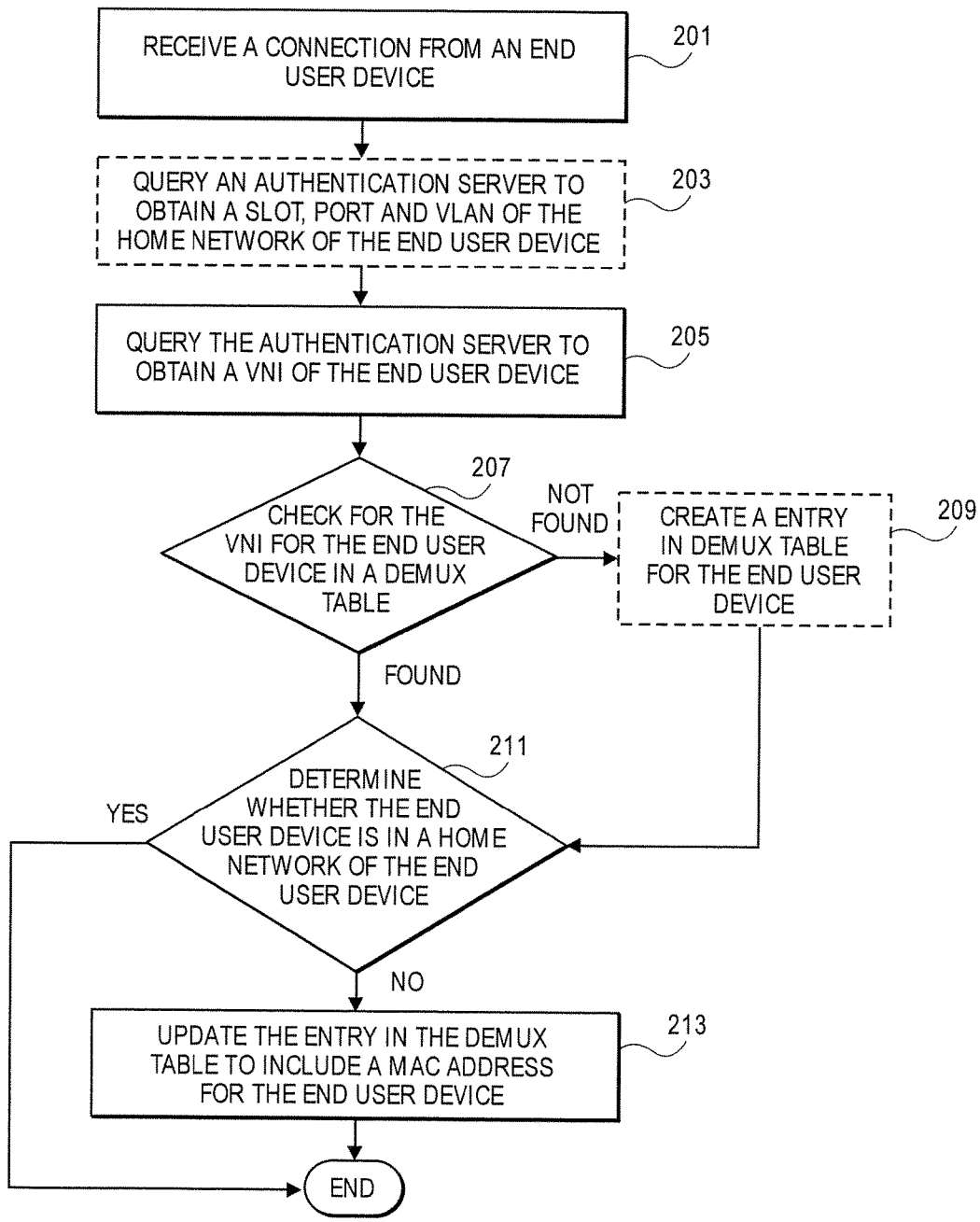
FIG. 2 is a diagram of one embodiment of a process for handling subscriber connections at the border network gateway (BNG).

As described in relation to FIG. 2, the process for connecting a user device has been augmented to determine whether the user device is in its home network and to track a MAC address for the user device. The process can be initiated in response to receiving a connection from an end user device at the BNG (Block 201). The BNG may query an Authentication, Authorization and Accounting (AAA) server to obtain a slot:port:vlan of the home network for the end user device (Block 203). The AAA server can be configured by a service provider with this information that can be retrieved by any BNG functioning as a virtual home gateway. The query can also include a request for a VNI for the user device (Block 205). This can be similarly configured by the service provider.

A check can then be performed to determine whether there is an entry in the demultiplexor table of the BNG for the VNI of the end user device (Block 207). If no entry is found in the demultiplexor table then an entry for the end user device is created (Block 209). After the creation of the entry or if an entry already exists, then a check is performed to determine whether the end user device is in the home network of the user (Block 211). This determination of whether the end user device is in its home network or roaming is described further herein below. If the end user device is in its home network then no further action is required and the process can terminate. However, if the end user device is in a guest network then the process updates the entry in the demultiplexor table to include a MAC address for the end user device (Block 213). Thus, at the completion of the process the demultiplexor table will have an entry for the end user device that includes its VNI and home slot:port:vlan. If the end user device is roaming, then the entry will in addition include the MAC address and the current slot:port:vlan.

Figure 3:
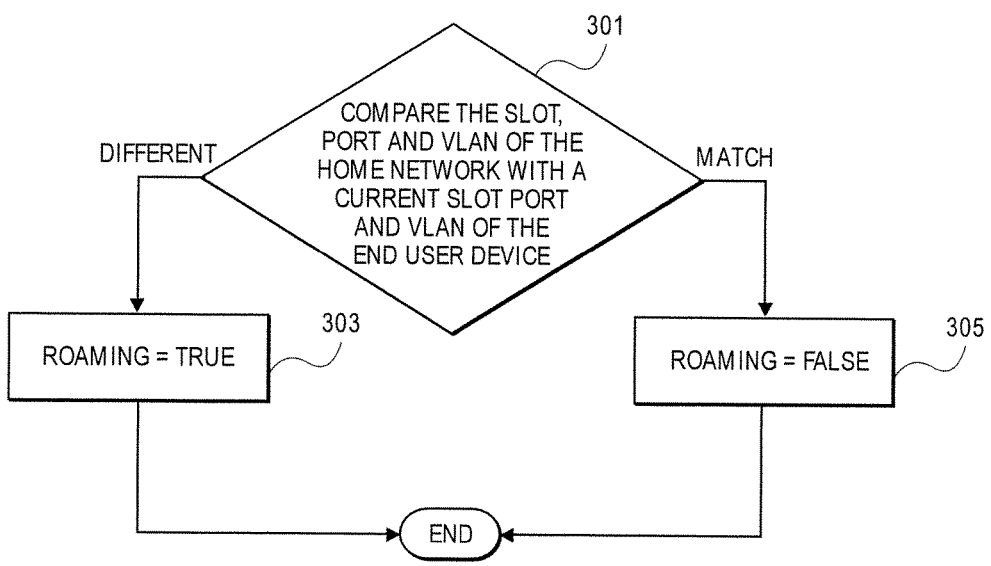
FIG. 3 is a flowchart of one embodiment of a process for determining whether a subscriber is connecting from outside a home network of the subscriber.

FIG. 3 is a flowchart of the process for determining whether the user device is in its home network. Where the BNG needs to determine whether a connecting user device is in its home network a comparison is made between the slot:port:vlan of the home network that is provided by the query of the AAA server and the slot:port:vlan that the connection request of the user device was received through (i.e. the current slot:port:vlan). If these slot:port:vlan are the same then the user device is considered to be in its home network (Block 305). However, if the values are different in any respect, then the user device is considered to be outside of its home network or 'roaming' (Block 303). This determination can be returned as a value or can be set as a flag such as a roaming flag that is set to true or false.

With the demultiplexor table properly configured at the time of user device connection, the demultiplexor table can be utilized for the proper forwarding of data traffic destined for the user device by doing a lookup of the VNI in the VNI encapsulation of the data traffic received at the BNG on the trunk side.

Figure 4:
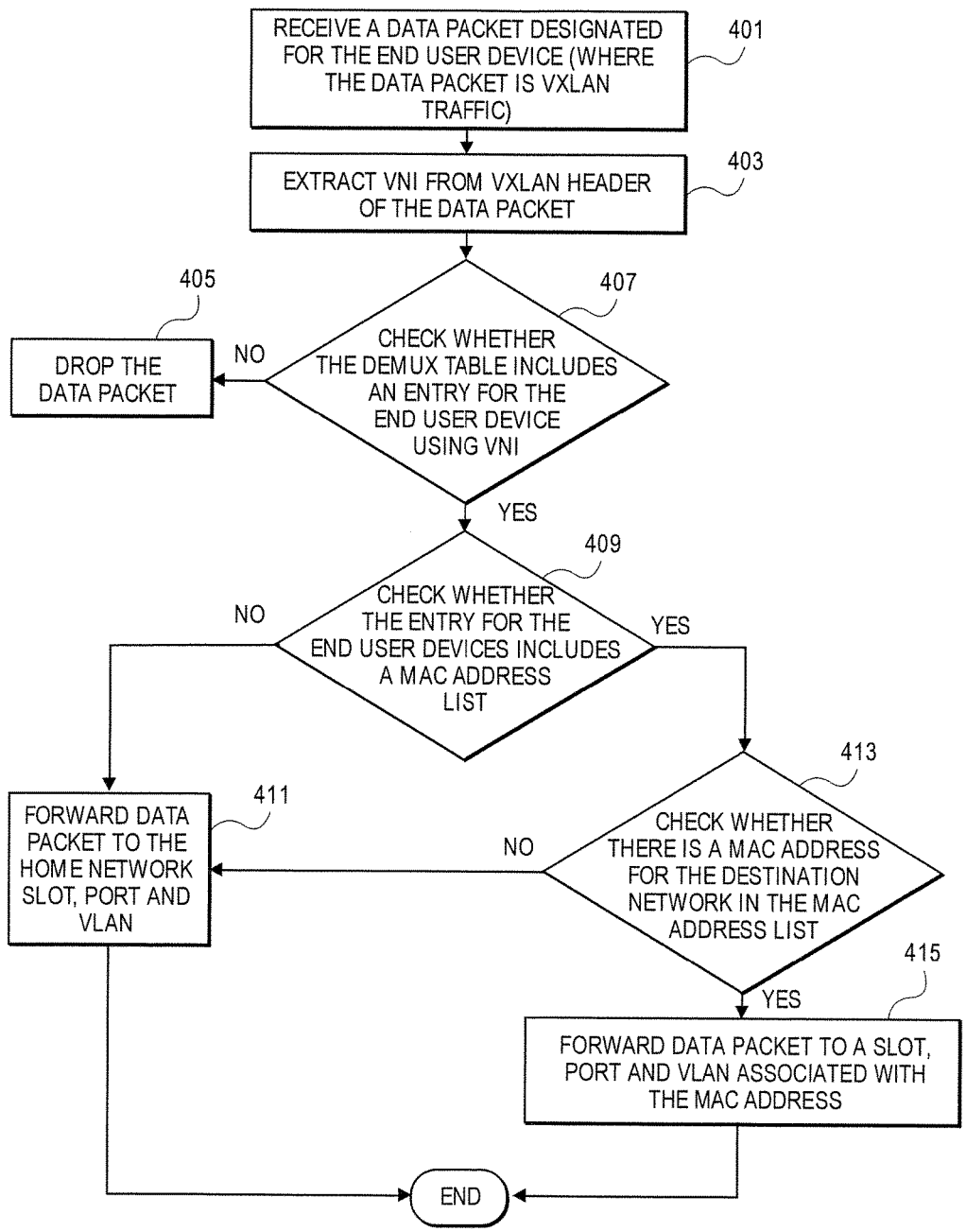
FIG. 4 is a flowchart of one embodiment of a process for handling data traffic destined for a subscriber.

FIG. 4 is a flowchart of one embodiment of the process for handling downstream data traffic at the BNG. In other words, data traffic that is received on a trunk port and has a VNI identifying a user device. The process can be initiated in response to receiving a data packet designated for the end user device, where the data packet is a VNI encapsulated data packet indicating VXLAN data traffic (Block 401). The VNI is then extracted from the VXLAN header of the data packet (Block 403). A check is then performed to determine whether the demultiplexor table includes an entry for the end user device using the extracted VNI (Block 407). In other words, a look up on the demultiplexor table using the extracted VNI is performed. If an entry with the VNI is not found, then the received data packet is dropped.

However, if an entry is found for the VNI, then a check is performed to determine whether the entry for the end user device includes a MAC address list (Block 409). If no MAC address list is found, then the data packet is forwarded to the home network slot:port:vlan. If a MAC address list is found, this indicates that some of the user devices tied to a subscription and a VNI are outside of their home network. A check is then made whether a MAC address for the destination network of the received data packet is found (Block 413). If no match is found then the data packet is forwarded to the home network slot:port:vlan. If a match is found, then the data packet is forwarded to a slot:port:vlan associated with the MAC address in the demultiplexor table.

A further example is provided in relation to FIGS. 1B and 1C, while the examples provided are with one subscriber device accessing from a remote CPE, the algorithm for subscriber downstream demultiplexor provisioning and lookup is designed to be generic to work with multiple subscribers with multiple remote access devices spanning across different VNIs and across different remote slot:port:vlan. In another example embodiment, device D1 accesses from remote CPE-3, which is terminating on an access slot:port:vlan 3:1:30 in this example on a different BNG than the one where the subscriber's home CPE is terminating. This scenario is depicted in FIG. 1C. The VNI is maintained as unique across the service provider network, on BNG-2 is no CPE homed with a VNI that is the same as that of the home CPE-1.

In this example, upstream traffic is handled as normal and device D1 would be using IP address from the roaming pool for VNI 1010. A look up of the source MAC at the access port to get the VXLAN encapsulation (VNI) would be performed and the data packet would be forwarded to the trunk port. For downstream traffic there will hit at trunk port of BNG-2, because of the bridging function provided by the VXLAN gateway. Here the VNI lookup followed by the MAC look up would give the access slot:port:vlan to which the traffic is to be forwarded. This is similar to the other remote access scenario described above and demonstrates the versatility and scalability of the embodiments of the process and system.

Architecture

Figure 5:
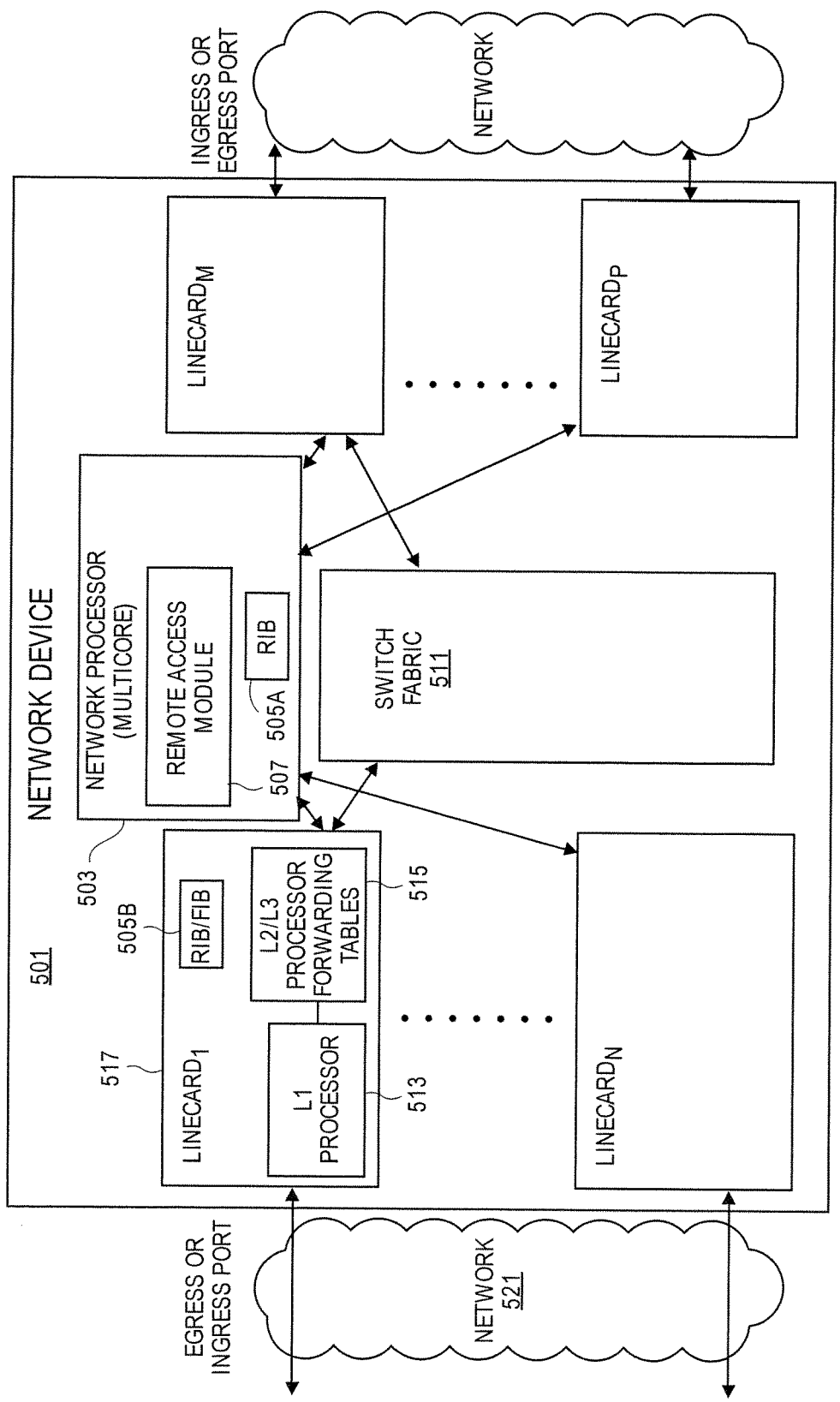
FIG. 5 is a diagram of one embodiment of a network device (ND) implementing a process for remote access to subscriber services.

FIG. 5A is a diagram of one embodiment of a network device implementing the remote access process and system. A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

In one embodiment, the maintenance of the demultiplexor table for tracking the MAC addresses of roaming end user devices as well as the upstream and downstream data packet handling that utilizes the demultiplexor table is implemented by a network device 501 or similar computing device. The network device 501 can have any structure that enables it to receive data traffic and forward it toward its destination. The network device 501 can include a network processor 503 or set of network processors that execute the functions of the network device 501. A 'set,' as used herein, is any positive whole number of items including one item. The network device 501 can execute an a remote access module 507 to implement the functions of maintaining the demultiplexor table and for proper forwarding of data packets to and from end user devices in visiting networks where the network device 501 functions as BNG as described herein above via a network processor 503.

The network device 501 connects with separately administered networks that have user equipment and/or content servers. The network processor 503 can implement the remote access module 507 as a discrete hardware, software module or any combination thereof. The network processor 503 can also service the routing information base 505A and similar functions related to data traffic forwarding and network topology maintenance. The routing information base 505A can be implemented as match action tables that are utilized for forwarding protocol data units PDUs (i.e. packets). The functions of the remote access module 507 can be implemented as modules in any combination of software, including firmware, and hardware within the network device. The functions of the remote access module 507 that are executed and implemented by the network device 501 include those described further herein above.

In one embodiment, the network device 501 can include a set of line cards 517 that process and forward the incoming data traffic toward the respective destination nodes by identifying the destination and forwarding the data traffic to the appropriate line card 517 having an egress port that leads to or toward the destination via a next hop. These line cards 517 can also implement the forwarding information base 505B, or a relevant subset thereof. The line cards 517 can also implement or facilitate the remote access module 507 functions described herein above. The line cards 517 are in communication with one another via a switch fabric 511 and communicate with other nodes over attached networks 521 using Ethernet, fiber optic or similar communication links and media.

The operations of the flow diagrams have been described with reference to the exemplary embodiment of the block diagrams. However, it should be understood that the operations of the flowcharts could be performed by embodiments of the invention other than those discussed, and the embodiments discussed with reference to block diagrams can perform operations different from those discussed with reference to the flowcharts. While the flowcharts show a particular order of operations performed by certain embodiments, it should be understood that such order is exemplary (e.g., alternative embodiments may perform the operations in a different order, combine certain operations, overlap certain operations, etc.).

As described herein, operations performed by the network device 501 may refer to specific configurations of hardware such as application specific integrated circuits (ASICs) configured to perform certain operations or having a predetermined functionality, or software instructions stored in memory embodied in a non-transitory computer readable storage medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals-such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. One or more parts of an embodiment of the invention may be implemented using different combinations of software, firmware, and/or hardware.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) to establish network connections (to transmit and/or receive code and/or data using propagating signals) with other electronic devices. One or more parts of an embodiment of the invention may be implemented using different combinations of software, firmware, and/or hardware.

Figures 6A, 6B:
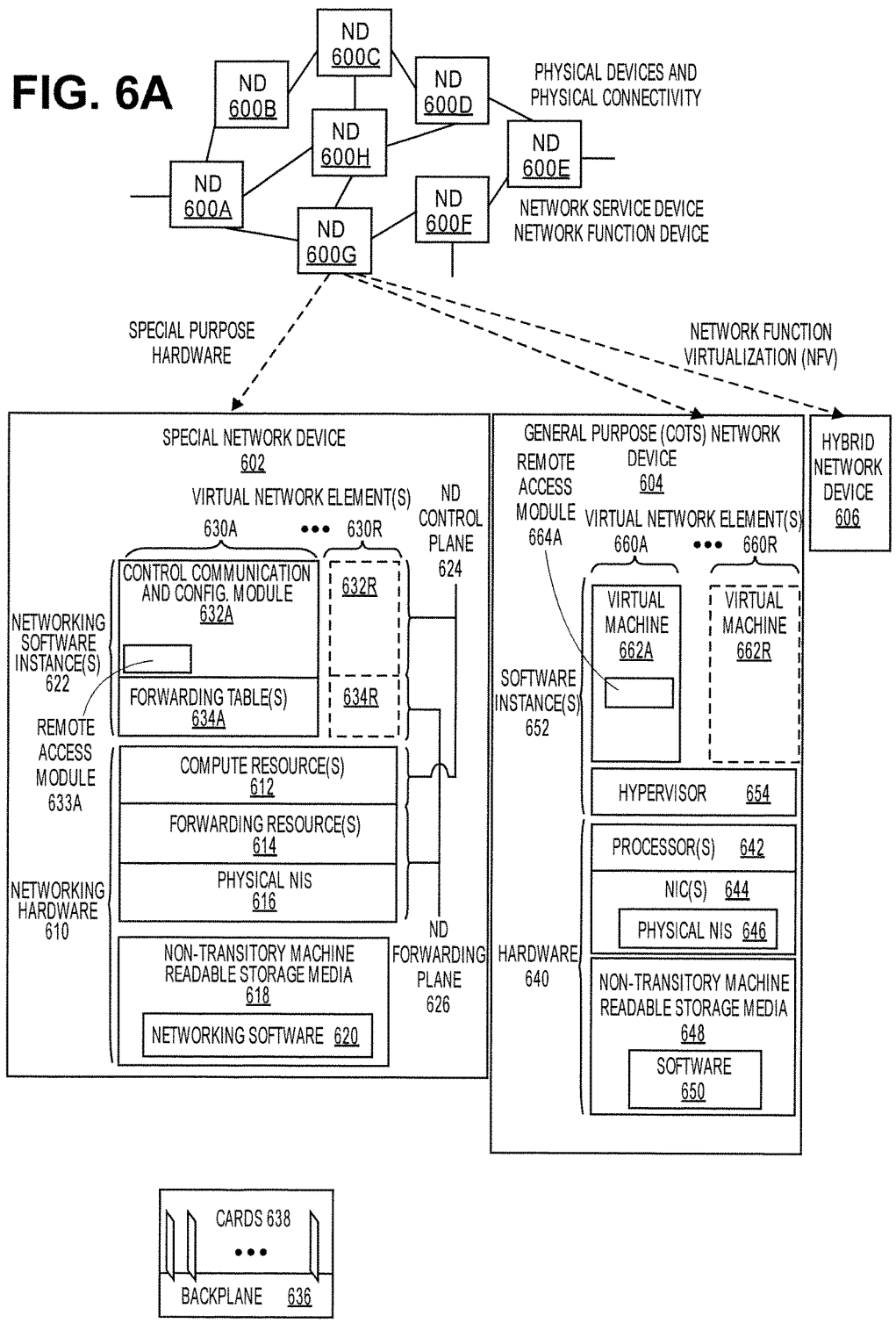
FIG. 6A illustrates connectivity between network devices (NDs) within an exemplary network, as well as three exemplary implementations of the NDs, according to some embodiments of the invention.
FIG. 6B illustrates an exemplary way to implement the special-purpose network device according to some embodiments of the invention.

FIG. 6A illustrates connectivity between network devices (NDs) within an exemplary network, as well as three exemplary implementations of the NDs, according to some embodiments of the invention. FIG. 6A shows NDs 600A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 600A, E, and F illustrates that these NDs act as ingress and egress points for the network (and thus, these NDs are sometimes referred to as edge NDs; while the other NDs may be called core NDs).

Two of the exemplary ND implementations in FIG. 6A are: 1) a special-purpose network device 602 that uses custom application—specific integrated circuits (ASICs) and a proprietary operating system (OS); and 2) a general-purpose network device 604 that uses common off-the-shelf (COTS) processors and a standard OS.

The special-purpose network device 602 includes networking hardware 610 comprising compute resource(s) 612 (which typically include a set of one or more processors), forwarding resource(s) 614 (which typically include one or more ASICs and/or network processors), and physical network interfaces (NIs) 616 (sometimes called physical ports), as well as non-transitory machine readable storage media 618 having stored therein networking software 620. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 600A-H. During operation, the networking software 620 may be executed by the networking hardware 610 to instantiate a set of one or more networking software instance(s) 622. Each of the networking software instance(s) 622, and that part of the networking hardware 610 that executes that network software instance (be it hardware dedicated to that networking software instance and/or time slices of hardware temporally shared by that networking software instance with others of the networking software instance(s) 622), form a separate virtual network element 630A-R. Each of the virtual network element(s) (VNEs) 630A-R includes a control communication and configuration module 632A-R (sometimes referred to as a local control module or control communication module) and forwarding table(s) 634A-R such that a given virtual network element (e.g., 630A) includes the control communication and configuration module (e.g., 632A), a set of one or more forwarding table(s) (e.g., 634A), and that portion of the networking hardware 610 that executes the virtual network element (e.g., 630A). In some embodiments, the control communication and configuration module 632A encompasses the remote access module 633A as described herein above.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

The special-purpose network device 602 is often physically and/or logically considered to include: 1) a ND control plane 624 (sometimes referred to as a control plane) comprising the compute resource(s) 612 that execute the control communication and configuration module(s) 632A-R; and 2) a ND forwarding plane 626 (sometimes referred to as a forwarding plane, a data plane, or a media plane) comprising the forwarding resource(s) 614 that utilize the forwarding table(s) (i.e. implemented as match action tables) 634A-R and the physical NIs 616. By way of example, where the ND is a router (or is implementing routing functionality), the ND control plane 624 (the compute resource(s) 612 executing the control communication and configuration module(s) 632A-R) is typically responsible for participating in controlling how data (e.g., packets) are to be routed (e.g., the next hop for the data and the outgoing physical NI for that data) and storing that routing information in the forwarding table(s) 634A-R, and the ND forwarding plane 626 is responsible for receiving that data on the physical NIs 616 and forwarding that data out the appropriate ones of the physical NIs 816 based on the forwarding table(s) 634A-R.

FIG. 6B illustrates an exemplary way to implement the special-purpose network device 602 according to some embodiments of the invention. FIG. 6B shows a special-purpose network device including cards 838 (typically hot pluggable). While in some embodiments the cards 638 are of two types (one or more that operate as the ND forwarding plane 626 (sometimes called line cards), and one or more that operate to implement the ND control plane 624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 636 (e.g., a first full mesh coupling the line cards and a second full mesh coupling all of the cards).

Returning to FIG. 6A, the general purpose network device 604 includes hardware 640 comprising a set of one or more processor(s) 642 (which are often COTS processors) and network interface controller(s) 644 (NICs; also known as network interface cards) (which include physical NIs 646), as well as non-transitory machine readable storage media 648 having stored therein software 650. During operation, the processor(s) 642 execute the software 650 to instantiate a hypervisor 654 (sometimes referred to as a virtual machine monitor (VMM)) and one or more virtual machines 662A-R that are run by the hypervisor 654, which are collectively referred to as software instance(s) 652. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 662A-R, and that part of the hardware 640 that executes that virtual machine (be it hardware dedicated to that virtual machine and/or time slices of hardware temporally shared by that virtual machine with others of the virtual machine(s) 662A-R), forms a separate virtual network element(s) 660A-R. In some embodiments, the virtual machine module 662A encompasses remote access module 664A.

The virtual network element(s) 660A-R perform similar functionality to the virtual network element(s) 630A-R. For instance, the hypervisor 654 may present a virtual operating platform that appears like networking hardware 610 to virtual machine 662A, and the virtual machine 662A may be used to implement functionality similar to the control communication and configuration module(s) 632A and forwarding table(s) 634A (this virtualization of the hardware 640 is sometimes referred to as network function virtualization (NFV)). Thus, NFV may be used to consolidate many network equipment types onto industry standard high volume server hardware, physical switches, and physical storage, which could be located in Data centers, NDs, and customer premises equipment (CPE). However, different embodiments of the invention may implement one or more of the virtual machine(s) 662A-R differently. For example, while embodiments of the invention are illustrated with each virtual machine 662A-R corresponding to one VNE 660A-R, alternative embodiments may implement this correspondence at a finer level of granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In certain embodiments, the hypervisor 654 includes a virtual switch that provides similar forwarding services as a physical Ethernet switch. Specifically, this virtual switch forwards traffic between virtual machines and the NIC(s) 644, as well as optionally between the virtual machines 662A-R; in addition, this virtual switch may enforce network isolation between the VNEs 660A-R that by policy are not permitted to communicate with each other (e.g., by honoring virtual local area networks (VLANs)).

The third exemplary ND implementation in FIG. 6A is a hybrid network device 606, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 602) could provide for para-virtualization to the networking hardware present in the hybrid network device 606.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 630A-R, VNEs 660A-R, and those in the hybrid network device 606) receives data on the physical NIs (e.g., 616, 646) and forwards that data out the appropriate ones of the physical NIs (e.g., 616, 646). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

Figure 6C:
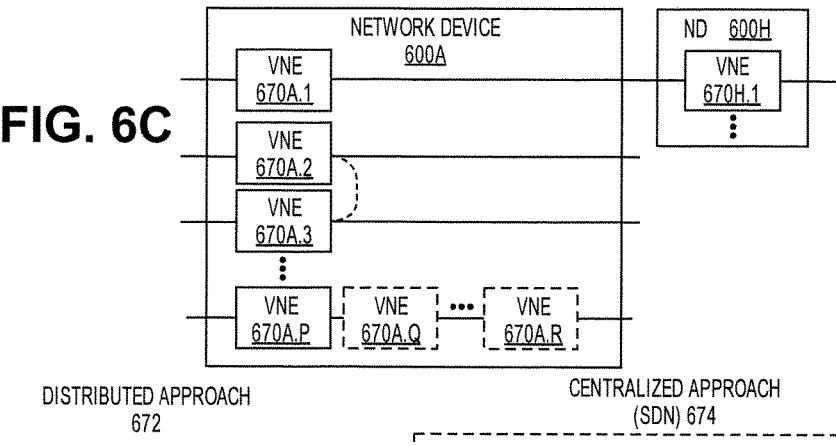
FIG. 6C illustrates various exemplary ways in which virtual network elements (VNEs) may be coupled according to some embodiments of the invention.

FIG. 6C illustrates various exemplary ways in which VNEs may be coupled according to some embodiments of the invention. FIG. 6C shows VNEs 670A.1-670A.P (and optionally VNEs 670A.Q-670A.R) implemented in ND 600A and VNE 670H.1 in ND 600H. In FIG. 6C, VNEs 670A.1-P are separate from each other in the sense that they can receive packets from outside ND 600A and forward packets outside of ND 600A; VNE 670A.1 is coupled with VNE 670H.1, and thus they communicate packets between their respective NDs; VNE 670A.2-670A.3 may optionally forward packets between themselves without forwarding them outside of the ND 600A; and VNE 670A.P may optionally be the first in a chain of VNEs that includes VNE 670A.Q followed by VNE 670A.R (this is sometimes referred to as dynamic service chaining, where each of the VNEs in the series of VNEs provides a different service—e.g., one or more layer 4-7 network services). While FIG. 6C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 6A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content server or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 6A may also host one or more such servers (e.g., in the case of the general purpose network device 604, one or more of the virtual machines 662A-R may operate as servers; the same would be true for the hybrid network device 606; in the case of the special-purpose network device 602, one or more such servers could also be run on a hypervisor executed by the compute resource(s) 612; in which case the servers are said to be co-located with the VNEs of that ND.

A virtual network is a logical abstraction of a physical network (such as that in FIG. 6A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 6D:
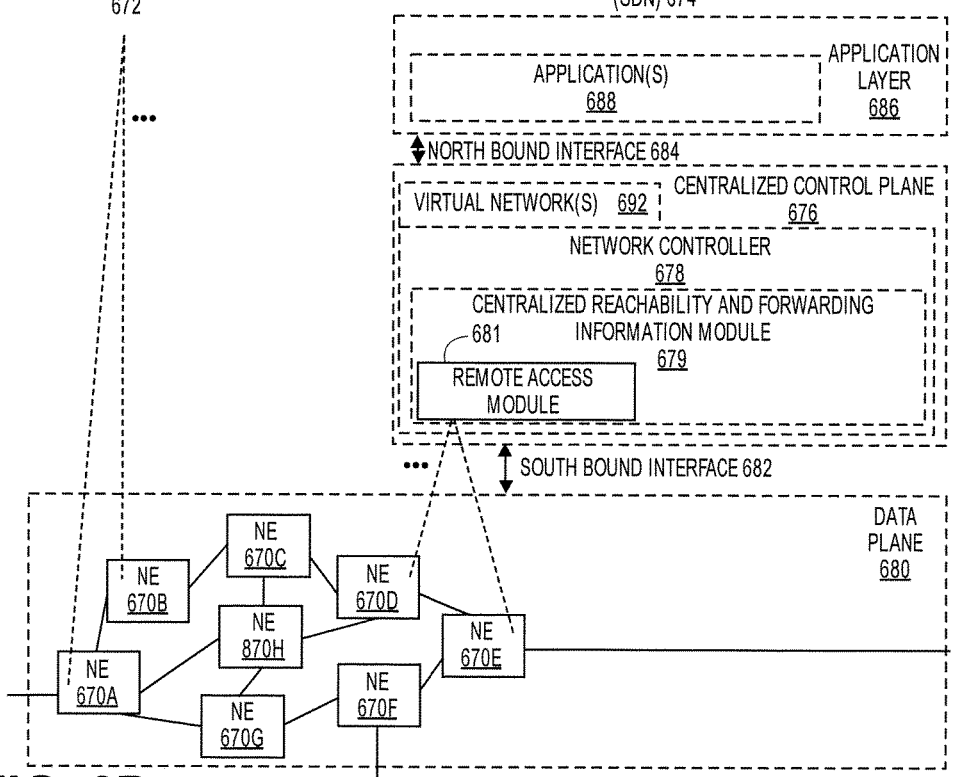
FIG. 6D illustrates a network with a single network element (NE) on each of the NDs of FIG. 6A.

FIG. 6D illustrates a network with a single network element on each of the NDs of FIG. 6A, and within this straight forward approach contrasts a traditional distributed approach (commonly used by traditional routers) with a centralized approach for maintaining reachability and forwarding information (also called network control), according to some embodiments of the invention. Specifically, FIG. 6D illustrates network elements (NEs) 670A-H with the same connectivity as the NDs 600A-H of FIG. 6A.

FIG. 6D illustrates that the distributed approach 672 distributes responsibility for generating the reachability and forwarding information across the NEs 670A-H; in other words, the process of neighbor discovery and topology discovery is distributed.

For example, where the special-purpose network device 602 is used, the control communication and configuration module(s) 632A-R of the ND control plane 624 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 670A-H (e.g., the compute resource(s) 612 executing the control communication and configuration module(s) 632A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 624. The ND control plane 624 programs the ND forwarding plane 626 with information (e.g., adjacency and route information) based on the routing structure(s). For example, the ND control plane 624 programs the adjacency and route information into one or more forwarding table(s) 634A-R that are implementations of match action tables (e.g., Forwarding Information Base (FIB), Label Forwarding Information Base (LFIB), and one or more adjacency structures) on the ND forwarding plane 626. For layer 2 forwarding, the ND can store one or more bridging tables that are used to forward data based on the layer 2 information in that data. While the above example uses the special-purpose network device 602, the same distributed approach 672 can be implemented on the general purpose network device 604 and the hybrid network device 606.

FIG. 6D illustrates that a centralized approach 674 (also known as software defined networking (SDN)) that decouples the system that makes decisions about where traffic is sent from the underlying systems that forwards traffic to the selected destination. The illustrated centralized approach 674 has the responsibility for the generation of reachability and forwarding information in a centralized control plane 676 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 676 has a south bound interface 682 with a data plane 680 (sometime referred to the infrastructure layer, network forwarding plane, or forwarding plane (which should not be confused with a ND forwarding plane)) that includes the NEs 670A-H (sometimes referred to as switches, forwarding elements, data plane elements, or nodes). The centralized control plane 676 includes a network controller 678, which includes a centralized reachability and forwarding information module 679 that determines the reachability within the network and distributes the forwarding information to the NEs 670A-H of the data plane 680 over the south bound interface 682 (which may use the OpenFlow protocol). Thus, the network intelligence is centralized in the centralized control plane 676 executing on electronic devices that are typically separate from the NDs.

For example, where the special-purpose network device 602 is used in the data plane 680, each of the control communication and configuration module(s) 632A-R of the ND control plane 624 typically include a control agent that provides the VNE side of the south bound interface 682. In this case, the ND control plane 624 (the compute resource(s) 612 executing the control communication and configuration module(s) 632A-R) performs its responsibility for participating in controlling how data (e.g., packets) is to be routed (e.g., the next hop for the data and the outgoing physical NI for that data) through the control agent communicating with the centralized control plane 676 to receive the forwarding information (and in some cases, the reachability information) from the centralized reachability and forwarding information module 679 (it should be understood that in some embodiments of the invention, the control communication and configuration module(s) 632A-R, in addition to communicating with the centralized control plane 676, may also play some role in determining reachability and/or calculating forwarding information—albeit less so than in the case of a distributed approach; such embodiments are generally considered to fall under the centralized approach 674, but may also be considered a hybrid approach). In some embodiments, the centralized reachability and forwarding module 679 encompasses remote access functions in remote access module 681 as described herein above.

While the above example uses the special-purpose network device 602, the same centralized approach 674 can be implemented with the general purpose network device 604 (e.g., each of the VNE 660A-R performs its responsibility for controlling how data (e.g., packets) is to be routed (e.g., the next hop for the data and the outgoing physical NI for that data) by communicating with the centralized control plane 676 to receive the forwarding information (and in some cases, the reachability information) from the centralized reachability and forwarding information module 679; it should be understood that in some embodiments of the invention, the VNEs 660A-R, in addition to communicating with the centralized control plane 676, may also play some role in determining reachability and/or calculating forwarding information—albeit less so than in the case of a distributed approach) and the hybrid network device 606. In fact, the use of SDN techniques can enhance the NFV techniques typically used in the general purpose network device 604 or hybrid network device 606 implementations as NFV is able to support SDN by providing an infrastructure upon which the SDN software can be run, and NFV and SDN both aim to make use of commodity server hardware and physical switches.

FIG. 6D also shows that the centralized control plane 676 has a north bound interface 684 to an application layer 686, in which resides application(s) 688. The centralized control plane 676 has the ability to form virtual networks 692 (sometimes referred to as a logical forwarding plane, network services, or overlay networks (with the NEs 670A-H of the data plane 680 being the underlay network)) for the application(s) 688. Thus, the centralized control plane 676 maintains a global view of all NDs and configured NEs/VNEs, and it maps the virtual networks to the underlying NDs efficiently (including maintaining these mappings as the physical network changes either through hardware (ND, link, or ND component) failure, addition, or removal). The application layer 686 thus enables the execution of applications that manage or interact with the functions associated with the network elements.

While FIG. 6D shows the distributed approach 672 separate from the centralized approach 674, the effort of network control may be distributed differently or the two combined in certain embodiments of the invention. For example: 1) embodiments may generally use the centralized approach (SDN) 674, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 674, but may also be considered a hybrid approach.

While FIG. 6D illustrates the simple case where each of the NDs 600A-H implements a single NE 670A-H, it should be understood that the network control approaches described with reference to FIG. 6D also work for networks where one or more of the NDs 600A-H implement multiple VNEs (e.g., VNEs 630A-R, VNEs 660A-R, those in the hybrid network device 606). Alternatively or in addition, the network controller 678 may also emulate the implementation of multiple VNEs in a single ND. Specifically, instead of (or in addition to) implementing multiple VNEs in a single ND, the network controller 678 may present the implementation of a VNE/NE in a single ND as multiple VNEs in the virtual networks 692 (all in the same one of the virtual network(s) 692, each in different ones of the virtual network(s) 692, or some combination). For example, the network controller 678 may cause an ND to implement a single VNE (a NE) in the underlay network, and then logically divide up the resources of that NE within the centralized control plane 676 to present different VNEs in the virtual network(s) 692 (where these different VNEs in the overlay networks are sharing the resources of the single VNE/NE implementation on the ND in the underlay network).

Figure 6E:
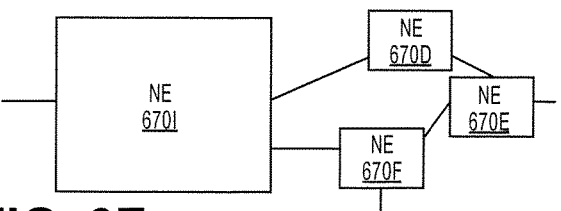
FIG. 6E illustrates an example where each of the NDs implements a single NE (see FIG. 6D), but the centralized control plane has abstracted multiple of the NEs in different NDs into a single NE in one of the virtual network(s) of FIG. 6D, according to some embodiments of the invention.
Figure 6F:
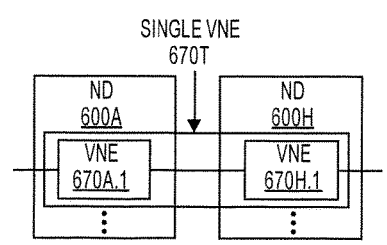
FIG. 6F illustrates a case where multiple VNEs are implemented on different NDs and are coupled to each other, and where the centralized control plane has abstracted these multiple VNEs such that they appear as a single VNE within one of the virtual networks of FIG. 6, according to some embodiments of the invention.

On the other hand, FIGS. 6E and 6F respectively illustrate exemplary abstractions of NEs and VNEs that the network controller 678 may present as part of different ones of the virtual networks 692. FIG. 6E illustrates the simple case of where each of the NDs 600A-H implements a single NE 670A-H (see FIG. 6D), but the centralized control plane 676 has abstracted multiple of the NEs in different NDs (the NEs 670A-C and G-H) into (to represent) a single NE 6701 in one of the virtual network(s) 692 of FIG. 6D, according to some embodiments of the invention. FIG. 6E shows that in this virtual network, the NE 6701 is coupled to NE 670D and 670F, which are both still coupled to NE 670E.

FIG. 6F illustrates a case where multiple VNEs (VNE 670A.1 and VNE 670H.1) are implemented on different NDs (ND 600A and ND 600H) and are coupled to each other, and where the centralized control plane 676 has abstracted these multiple VNEs such that they appear as a single VNE 670T within one of the virtual networks 692 of FIG. 6D, according to some embodiments of the invention. Thus, the abstraction of a NE or VNE can span multiple NDs.

While some embodiments of the invention implement the centralized control plane 676 as a single entity (e.g., a single instance of software running on a single electronic device), alternative embodiments may spread the functionality across multiple entities for redundancy and/or scalability purposes (e.g., multiple instances of software running on different electronic devices).

Figure 7:
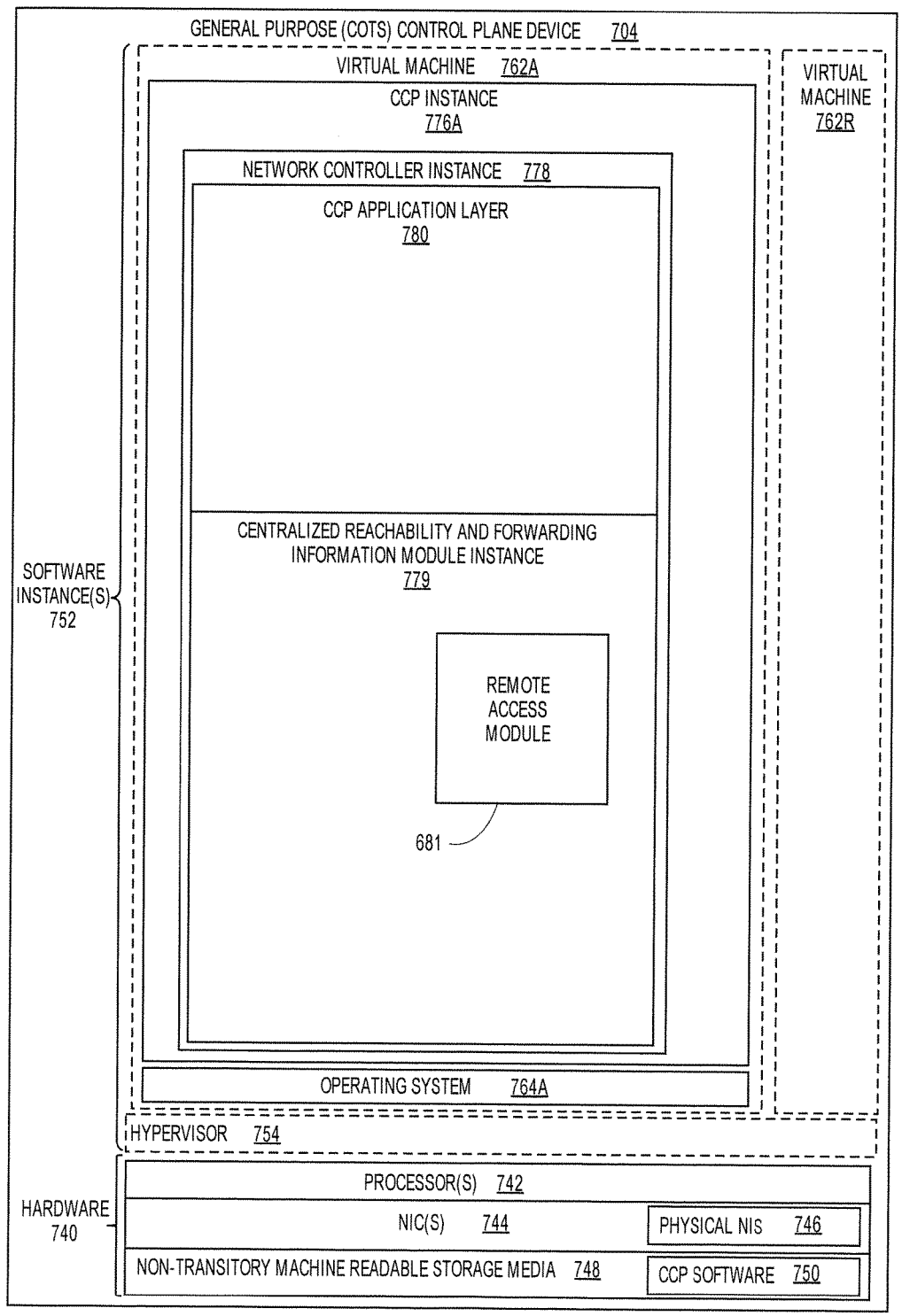
FIG. 7 illustrates a general purpose control plane device including hardware comprising a set of one or more processor(s) (which are often Commercial off-the-shelf (COTS) processors) and network interface controller(s) (NICs; also known as network interface cards) (which include physical NIs), as well as non-transitory machine readable storage media having stored therein centralized control plane (CCP) software), according to some embodiments of the invention.

Similar to the network device implementations, the electronic device(s) running the centralized control plane 676, and thus the network controller 678 including the centralized reachability and forwarding information module 679, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 7 illustrates, a general purpose control plane device 704 including hardware 740 comprising a set of one or more processor(s) 742 (which are often COTS processors) and network interface controller(s) 744 (NICs; also known as network interface cards) (which include physical NIs 746), as well as non-transitory machine readable storage media 748 having stored therein centralized control plane (CCP) software 750.

In embodiments that use compute virtualization, the processor(s) 742 typically execute software to instantiate a hypervisor 754 (sometimes referred to as a virtual machine monitor (VMM)) and one or more virtual machines 762A-R that are run by the hypervisor 754; which are collectively referred to as software instance(s) 752. A virtual machine is a software implementation of a physical machine that runs programs as if they were executing on a physical, non-virtualized machine; and applications generally are not aware they are running on a virtual machine as opposed to running on a "bare metal" host electronic device, though some systems provide para-virtualization which allows an operating system or application to be aware of the presence of virtualization for optimization purposes. Again, in embodiments where compute virtualization is used, during operation an instance of the CCP software 750 (illustrated as CCP instance 776A) on top of an operating system 764A are typically executed within the virtual machine 762A. In embodiments where compute virtualization is not used, the CCP instance 776A on top of operating system 764A is executed on the "bare metal" general purpose control plane device 704.

The operating system 764A provides basic processing, input/output (I/O), and networking capabilities. In some embodiments, the CCP instance 776A includes a network controller instance 778. The network controller instance 778 includes a centralized reachability and forwarding information module instance 779 (which is a middleware layer providing the context of the network controller 778 to the operating system 764A and communicating with the various NEs), and an CCP application layer 780 (sometimes referred to as an application layer) over the middleware layer (providing the intelligence required for various network operations such as protocols, network situational awareness, and user—interfaces). At a more abstract level, this CCP application layer 780 within the centralized control plane 776 works with virtual network view(s) (logical view(s) of the network) and the middleware layer provides the conversion from the virtual networks to the physical view. The CCP application can encompass the functionality of the remote access module 781 as described herein above. Similarly, the CCP application layer 780 can implement the remote access module 687 in addition to the other applications 688.

The centralized control plane 776 transmits relevant messages to the data plane 680 based on CCP application layer 780 calculations and middleware layer mapping for each flow. A flow may be defined as a set of packets whose headers match a given pattern of bits; in this sense, traditional IP forwarding is also flow—based forwarding where the flows are defined by the destination IP address for example; however, in other implementations, the given pattern of bits used for a flow definition may include more fields (e.g., 10 or more) in the packet headers. Different NDs/NEs/VNEs of the data plane 680 may receive different messages, and thus different forwarding information. The data plane 680 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present invention may be carried out in other specific ways than those herein set forth without departing from the scope and essential characteristics of the invention. One or more of the specific processes discussed above may be carried out using one or more appropriately configured processing circuits. In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

The invention claimed is:

1. A method implemented by a border network gateway for enabling an end user device to access home network resources and receive subscriber services in a visited network that is administratively separated from the home network, where home network resources are connected with a virtual extended local area network, the method comprising the steps of:
   receiving a connection from the end user device via a customer premise equipment;
   querying an authentication server to obtain the virtual extended local area network (VXLAN) network identifier (VNI) for the end user device from the authentication server;
   checking for the VNI for the end user device in a demultiplexor table of the border network gateway;
   determining whether the end user device is in a home network of the end user device; and
   updating an entry in the demultiplexor table to include a media access control address for the end user device to enable connectivity with the virtual extended local area network and access to the home network resources, in response to determining the end user device is not in the home network of the end user device,
   wherein determining whether the end user device is in the home network includes
      querying the authentication server to obtain a slot, port and virtual local area network (VLAN) of the home network of the end user device, and
      comparing the slot, port and VLAN of the home network with a current slot, port and VLAN of the end user device.

2. A method implemented by a border network gateway for enabling an end user device to access home network resources and receive subscriber services in a visited network that is administratively separated from the home network, where home network resources are connected with a virtual extended local area network, the method comprising:
   receiving a connection from the end user device via a customer premise equipment;
   querying an authentication server to obtain the virtual extended local area network (VXLAN) network identifier (VNI) for the end user device from the authentication server;
   checking for the VNI for the end user device in a demultiplexor table of the border network gateway;
   determining whether the end user device is in a home network of the end user device;
   updating an entry in the demultiplexor table to include a media access control address for the end user device to enable connectivity with the virtual extended local area network and access to the home network resources, in response to determining the end user device is not in the home network of the end user device;
   receiving a data packet destined for the end user device; and
   checking whether the demultiplexor table of the border network gateway includes a media access control address for the end user device.

3. The method of claim 2, wherein checking whether the demultiplexor table of the border network gateway includes the media access control address further comprises:
   retrieving a media access control address list associated with the entry in the demultiplexor table.

4. The method of claim 3, wherein checking whether the demultiplexor table of the border network gateway includes the media access control address further comprises:
   checking the media access control list for the media access control address of the end user device; and
   forwarding the data packet destined for the end user device to a slot, port and VLAN associated with the media access control address of the end user device from the media access control list.

5. A network device functioning as a border network gateway configured to implement a method for enabling an end user device to access home network resources and receive subscriber services in a visited network that is administratively separated from the home network, where home network resources are connected with a virtual extended local area network, the network device comprising:
   a non-transitory computer-readable medium having stored therein a remote access module; and
   a processor coupled to the non-transitory computer-readable medium, the processor configured to execute the remote access module, the remote access module configured to receive a connection from the end user device via a customer premise equipment, to query an authentication server to obtain the virtual extended local area network (VXLAN) network identifier (VNI) for the end user device from the authentication server, to check for the VNI for the end user device in a demultiplexor table of the border network gateway, to determine whether the end user device is in a home network of the end user device, and to update an entry in the demultiplexor table to include a media access control address for the end user device to enable connectivity with the virtual extended local area network and access to the home network resources, in response to determining the end user device is not in the home network of the end user device, wherein the remote access module is further configured to determine whether the end user device is in the home network by querying the authentication server to obtain a slot, port and virtual local area network (VLAN) of the home network of the end user device, and to compare the slot, port and VLAN of the home network with a current slot, port and VLAN of the end user device.

6. A network device functioning as a border network gateway configured to implement a method for enabling an end user device to access home network resources and receive subscriber services in a visited network that is administratively separated from the home network, where home network resources are connected with a virtual extended local area network, the network device comprising:
  a non-transitory computer-readable medium having stored therein a remote access module; and
  a processor coupled to the non-transitory computer-readable medium, the processor configured to execute the remote access module, the remote access module configured to receive a connection from the end user device via a customer premise equipment, to query an authentication server to obtain the virtual extended local area network (VXLAN) network identifier (VNI) for the end user device from the authentication server, to check for the VNI for the end user device in a demultiplexor table of the border network gateway, to determine whether the end user device is in a home network of the end user device, and to update an entry in the demultiplexor table to include a media access control address for the end user device to enable connectivity with the virtual extended local area network and access to the home network resources, in response to determining the end user device is not in the home network of the end user device, wherein the remote access module is further configured to receive a data packet destined for the end user device, and to check whether the demultiplexor table of the border network gateway includes a media access control address for the end user device.

7. The network device of claim 6, wherein the remote access module is configured to check whether the demultiplexor table of the border network gateway includes the media access control address by retrieving a media access control address list associated with the entry in the demultiplexor table.

8. The network device of claim 7, wherein the remote access module is configured to check whether the demultiplexor table of the border network gateway includes the media access control address further by checking the media access control list for the media access control address of the end user device, and forwarding the data packet destined for the end user device to a slot, port and VLAN associated with the media access control address of the end user device from the media access control list.

9. A computing device functioning as a border network gateway, the computing device to execute a plurality of virtual machines for implementing network function virtualization (NFV), wherein a virtual machine from the plurality of virtual machines is configured to implement a method for enabling an end user device to access home network resources and receive subscriber services in a visited network that is administratively separated from the home network, where home network resources are connected with a virtual extended local area network, the computing device comprising:
  a non-transitory computer-readable medium having stored therein a remote access module; and
  a processor coupled to the non-transitory computer-readable medium, the processor configured to execute the virtual machine, the virtual machine to execute remote access module, the remote access module configured to receive a connection from the end user device via a customer premise equipment, to query an authentication server to obtain the virtual extended local area network (VXLAN) network identifier (VNI) for the end user device, to check for the VNI for the end user device in a demultiplexor table of the border network gateway; to determine whether the end user device is in a home network of the end user device; and to update an entry in the demultiplexor table to include a media access control address for the end user device to enable connectivity with the virtual extended local area network and access to the home network resources, in response to determining the end user device is not in the home network of the end user device, wherein the remote access module is further configured to determine whether the end user device is in the home network by querying the authentication server to obtain a slot, port and virtual local area network (VLAN) of the home network of the end user device, and to compare the slot, port and VLAN of the home network with a current slot, port and VLAN of the end user device.

10. A computing device functioning as a border network gateway, the computing device to execute a plurality of virtual machines for implementing network function virtualization (NFV), wherein a virtual machine from the plurality of virtual machines is configured to implement a method for enabling an end user device to access home network resources and receive subscriber services in a visited network that is administratively separated from the home network, where home network resources are connected with a virtual extended local area network, the computing device comprising:
  a non-transitory computer-readable medium having stored therein a remote access module; and
  a processor coupled to the non-transitory computer-readable medium, the processor configured to execute the virtual machine, the virtual machine to execute remote access module, the remote access module configured to receive a connection from the end user device via a customer premise equipment, to query an authentication server to obtain the virtual extended local area network (VXLAN) network identifier (VNI) for the end user device, to check for the VNI for the end user device in a demultiplexor table of the border network gateway; to determine whether the end user device is in a home network of the end user device; and to update an entry in the demultiplexor table to include a media access control address for the end user device to enable connectivity with the virtual extended local area network and access to the home network resources, in response to determining the end user device is not in the home network of the end user device, wherein the remote access module is further configured to receive a data packet destined for the end user device, and to check whether the demultiplexor table of the border network gateway includes a media access control address for the end user device.

11. The computing device of claim 10, wherein the remote access module is configured to check whether the demultiplexor table of the border network gateway includes the media access control address by retrieving a media access control address list associated with the entry in the demultiplexor table.

12. The computing device of claim 11, wherein the remote access module is configured to check whether the demultiplexor table of the border network gateway includes the media access control address further by checking the media access control list for the media access control address of the end user device, and forwarding the data packet destined for the end user device to a slot, port and VLAN associated with the media access control address of the end user device from the media access control list.

13. A control plane device to implement a control plane of a software defined networking (SDN) network including a plurality of network devices implementing the data plane of the SDN network, wherein control plane device is configured to execute a method for enabling an end user device to access home network resources and receive subscriber services in a visited network that is administratively separated from the home network, where home network resources are connected with a virtual extended local area network, the control plane device comprising:
 a non-transitory computer-readable medium having stored therein a remote access module; and
 a processor coupled to the non-transitory computer-readable medium, the processor configured to execute the remote access module, the remote access module configured to receive a connection from the end user device via a customer premise equipment, query an authentication server to obtain the virtual extended local area network (VXLAN) network identifier (VNI) for the end user device from the authentication server, check for the VNI for the end user device in a demultiplexor table of the border network gateway, to determine whether the end user device is in a home network of the end user device, and to update an entry in the demultiplexor table to include a media access control address for the end user device to enable connectivity with the virtual extended local area network and access to the home network resources, in response to determining the end user device is not in the home network of the end user device, wherein the remote access module is further configured to determine whether the end user device is in the home network by querying the authentication server to obtain a slot, port and virtual local area network (VLAN) of the home network of the end user device, and to compare the slot, port and VLAN of the home network with a current slot, port and VLAN of the end user device.

14. A control plane device to implement a control plane of a software defined networking (SDN) network including a plurality of network devices implementing the data plane of the SDN network, wherein control plane device is configured to execute a method for enabling an end user device to access home network resources and receive subscriber services in a visited network that is administratively separated from the home network, where home network resources are connected with a virtual extended local area network, the control plane device comprising:
 a non-transitory computer-readable medium having stored therein a remote access module; and
 a processor coupled to the non-transitory computer-readable medium, the processor configured to execute the remote access module, the remote access module configured to receive a connection from the end user device via a customer premise equipment, query an authentication server to obtain the virtual extended local area network (VXLAN) network identifier (VNI) for the end user device from the authentication server, check for the VNI for the end user device in a demultiplexor table of the border network gateway, to determine whether the end user device is in a home network of the end user device, and to update an entry in the demultiplexor table to include a media access control address for the end user device to enable connectivity with the virtual extended local area network and access to the home network resources, in response to determining the end user device is not in the home network of the end user device, wherein the remote access module is further configured to receive a data packet destined for the end user device, and to check whether the demultiplexor table of the border network gateway includes a media access control address for the end user device.

15. The control plane device of claim 14, wherein the remote access module is configured to check whether the demultiplexor table of the border network gateway includes the media access control address by retrieving a media access control address list associated with the entry in the demultiplexor table.

16. The computing device of claim 11, wherein the remote access module is configured to check whether the demultiplexor table of the border network gateway includes the media access control address further by checking the media access control list for the media access control address of the end user device, and forwarding the data packet destined for the end user device to a slot, port and VLAN associated with the media access control address of the end user device from the media access control list.

* * * * *